July 9, 1935.  L. P. SMITH  2,007,220
MULTI-TORSION-METER
Filed April 23, 1932  5 Sheets-Sheet 1

FIG. 1.

INVENTOR
LYBRAND P. SMITH.
BY
Robert A. Lavender
ATTORNEY

July 9, 1935.  L. P. SMITH  2,007,220
MULTI-TORSION-METER
Filed April 23, 1932   5 Sheets-Sheet 2

INVENTOR
LYBRAND P. SMITH.
BY
ATTORNEY

July 9, 1935.  L. P. SMITH  2,007,220
MULTI-TORSION-METER
Filed April 23, 1932   5 Sheets-Sheet 3

INVENTOR
LYBRAND P. SMITH.
BY
ATTORNEY

July 9, 1935.   L. P. SMITH   2,007,220
MULTI-TORSION-METER
Filed April 23, 1932   5 Sheets-Sheet 4

INVENTOR
LYBRAND P. SMITH
BY
ATTORNEY

July 9, 1935.  L. P. SMITH  2,007,220
MULTI-TORSION-METER
Filed April 23, 1932  5 Sheets-Sheet 5

INVENTOR
LYBRAND P. SMITH.
BY
ATTORNEY

Patented July 9, 1935

2,007,220

UNITED STATES PATENT OFFICE 2,007,220

MULTI-TORSION-METER

Lybrand P. Smith, United States Navy

Application April 23, 1932, Serial No. 607,087

17 Claims. (Cl. 265—25)

(Granted under the act of March 3, 1883, as amended April 30, 1928; 370 O. G. 757)

This invention relates to a system for observing the stress phenomena in a power shaft rotating under load.

The object of my invention is to provide means to measure the torsion of such shaft as an entirety, to study the torsion at any one of a desired number of phases during a single revolution if the torque is not uniform, to observe the phenomena present between such phases, to measure the average torque, and to count the revolutions of the shaft during a definite time interval.

With the above and other objects in view, this invention consists in the construction, combination and arrangement of parts as will be described more fully hereinafter.

Figure 1:
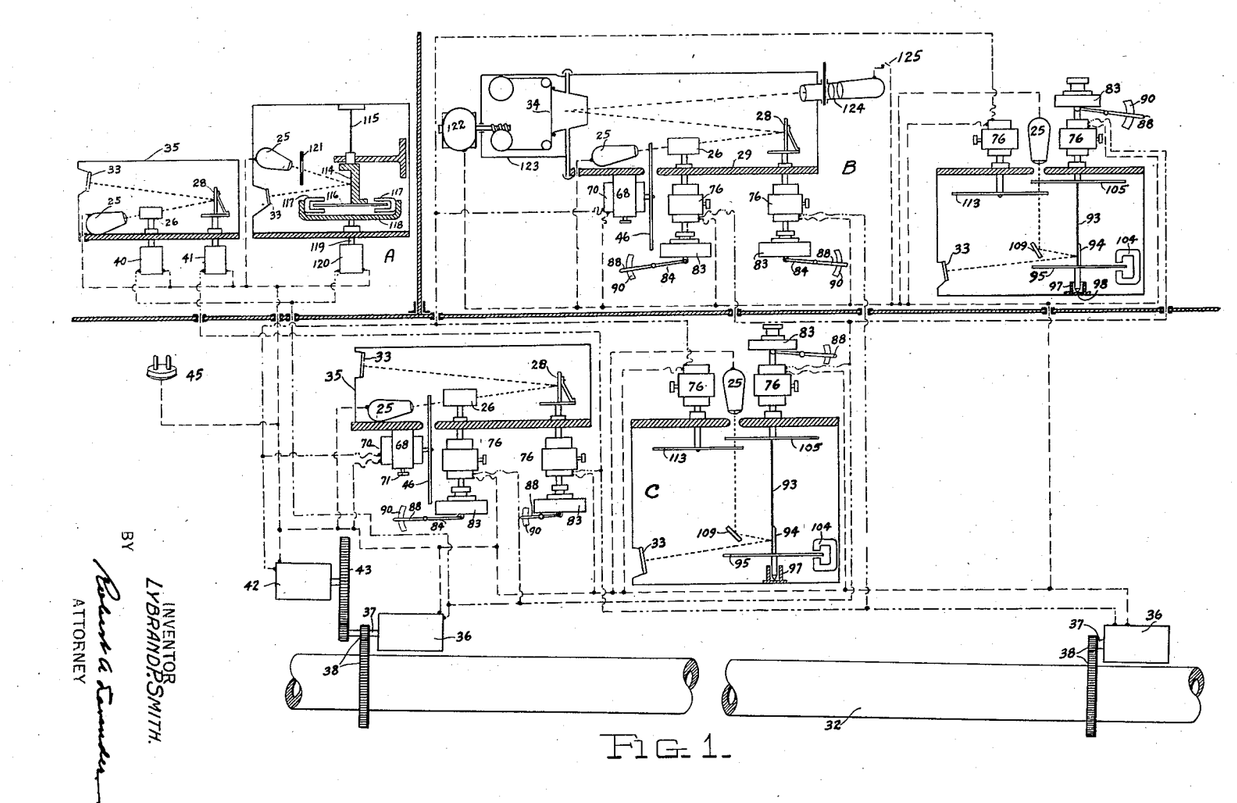
Fig. 1 is a schematic diagram of a system embodying my invention where are shown installations of indicating instruments at three different locations, a two-wire circuit being indicated by a line made up of dashes and a three-wire circuit by a line made up of dots and dashes in groups of two.
Figure 2:
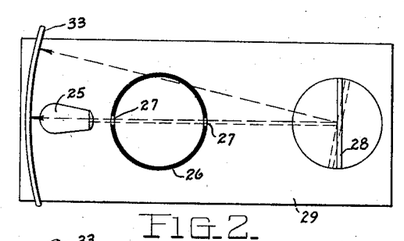
Fig. 2 is a top plan view of an optical system that forms a part of my invention.
Figure 3:
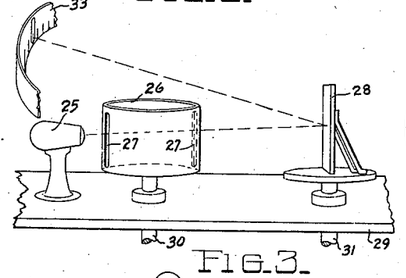
Fig. 3 is a side elevation of the parts shown in Fig. 2.

Referring more particularly to Figs. 2 and 3 of the drawings, 25 indicates a source of light projecting a brilliant beam of parallel rays by means of any suitable optical system. The light beam is interrupted by a revolving shutter 26 provided with pairs of diametrically opposed slits 27 that permit a momentary flash of light to pass through the shutter to a revolving mirror 28 mounted upon a suitable support 29. The shutter shown in the drawings is a barrel type shutter chosen on account of the sharp occulting effect produced, but it is to be understood that other types may be used without materially lessening the efficiency of the instrument. It will also be understood that any number of pairs of slits may be provided, it depending on the number of flashes desired per revolution of the shutter. The shutter is mounted on a rotatable shaft 30 that passes through support 29 and the revolving mirror is secured to a rotatable shaft 31, the two shafts being suitably and similarly driven by opposite ends of a main shaft 32 whose torsion is to be measured. The light beam is reflected by the mirror to a scale 33, preferably translucent, that may be calibrated in any arbitrary marks, as for example in degrees of twist, or to read directly in foot-pounds of torque for the shaft. If desired, a moving strip of sensitized film may be used as indicated at 34, Fig. 1, instead of the scale shown in the Figs. 2 and 3 and a record kept not only of how the torque may vary with changes of operation, but also of how the torque may vary at a number of different phases in any one revolution of the main shaft. The source of light, shutter and mirror are housed in a light-tight casing 35, as may be seen more clearly in Fig. 1.

Figure 5:
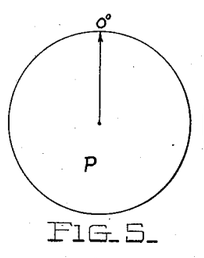
Fig. 5 represents the power end of the shaft to be studied.
Figure 7:
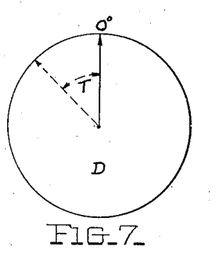
Fig. 7 represents the driven end of the shaft with the angle of torsion under load indicated thereon.

Figs. 5, 6, 7 and 8 show an application of the problem to be solved, wherein:

P represents a cross section of the power end of the shaft;

D represents a cross section of the driven end of the shaft;

S represents the shutter; and

M represents the mirror.

S is driven by P, and M by D, so that they will revolve at some given ratio ($m$)—say six revolutions of S and M to one revolution of P and D.

With everything at rest, the top of P and D is zero degrees. The shutter and mirror can be adjusted so that the slits in the former will be in alignment with the source of light. Then the mirror will reflect a beam of light on the scale at the zero mark. When the main shaft 32, Fig. 1, starts to revolve without delivering power, the shutter and mirror will rotate at some multiple of the rate of revolution of the shaft, as for example six times the rate of revolution of the shaft. If there is no lost motion or slip in the driving connections for the shutter and the mirror, the shutter will deliver two flashes of light per revolution of itself, and the mirror will reflect one of these flashes per revolution of itself and the shutter. Each flash will be reflected at the zero mark on the scale with only a slight halo due to the motion of the mirror during the extremely short time of duration of the flash.

Some lost motion or slip will occur, however, with any set of mechanical, electrical, or electro-mechanical driving connections for the shutter and mirror that it is mechanically practicable to make. However, two sets of such driving connections may be provided that will not only have small amounts of slip, but also the slips will be so nearly identical that the lost motion or slip in the one set is substantially equal to that in the other.

Due to this lost motion or slip, when the main shaft 32 is revolving, the shutter and mirror will lag behind P and D by very small angles. These angles will be identified $x_s$ and $x_m$ respectively, and since it is possible to make them very nearly equal, let $x_s = x_m = x$ for the purpose of the following analysis.

Figure 6:
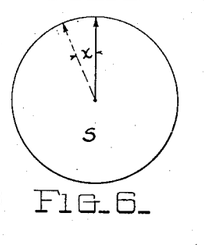
Fig. 6 shows the angular relation between the part of the shaft shown in Fig. 5 and a shutter driven thereby when lag is present in the connections.
Figure 8:
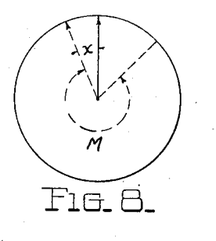
Fig. 8 represents the relation between a mirror driven from the part shown in Fig. 7.

When P and D are passing the zero point, S and M will be lagging $x°$, or will be at $-x°$ (shown diagrammatically by the dotted arrows in Figs. 6 and 8). When P and D are passing $+x°$, S and M will be at the zero point, and will throw the light beam to zero on the scale. This is due to the shaft 32 not delivering power, i. e., is not being twisted by torque.

When the main shaft 32 is delivering power, torque will be set up and D will lag behind P by some angle of twist, designated as T (Fig. 7). Therefore:

When P is at 0°, D will be at $-T°$;
S will be at $-x°$; M will be at $-x° -mT°$
(where m is the multiplying ratio of the drive gearing).
When P is at plus $x°$, D will be at plus $x° -T°$;
S will be at 0°; M will be at $0° -mT°$ The light beam will be cast through the slits in the shutter, strike the mirror, be reflected through the angle $2mT$, and be indicated on the scale.

In the case given, with $m=6$, suppose T is 3°. The light is then reflected through $2mT° = 2 \times 6 \times 3 = 36°$.

The type of driving connections between the power end of the main shaft and the shutter and the delivery end of the shaft and the mirror is not a part of the present invention. It must be borne in mind, however, that the two sets of driving connections for any one installation should be as nearly identical as it is practicable to manufacture them in order that the equation $x_s = x_m$ will be true for practical purposes. Should one driving connection contain a certain number of gears, universal joints, belts, chains, lengths of flexible shafting, self-synchronous generators and motors, the other driving connection should be made up of a like number, even though the structure of the surrounding engineering plant would not require such a number merely to transmit motion without regard to the amount of lost motion or slip.

I have found one of the most suitable types of driving connections to be a self-synchronous electrical system of transmission of angular positions. Such a system is diagrammatically shown in Fig. 1 wherein 36 designates generators or transmitters of that type adapted to be driven through shaft 37 and intermediate gearing 38 from the main shaft 32, and 40 and 41 are co-operating synchronized motors or receivers connected with the generators through the electric circuits shown, the dot and dash line being three phase, and the dash line two phase. The motors 40 and 41 drive the shutter 26 and mirror 28, respectively. A separate generator or transmitter 42, driven through intermediate gearing 43 from the gearing 38, drives receivers or motors to operate analyzing shutters to be described. 45 represents a connection to any suitable exterior source of electric power.

Figures 10, 11:
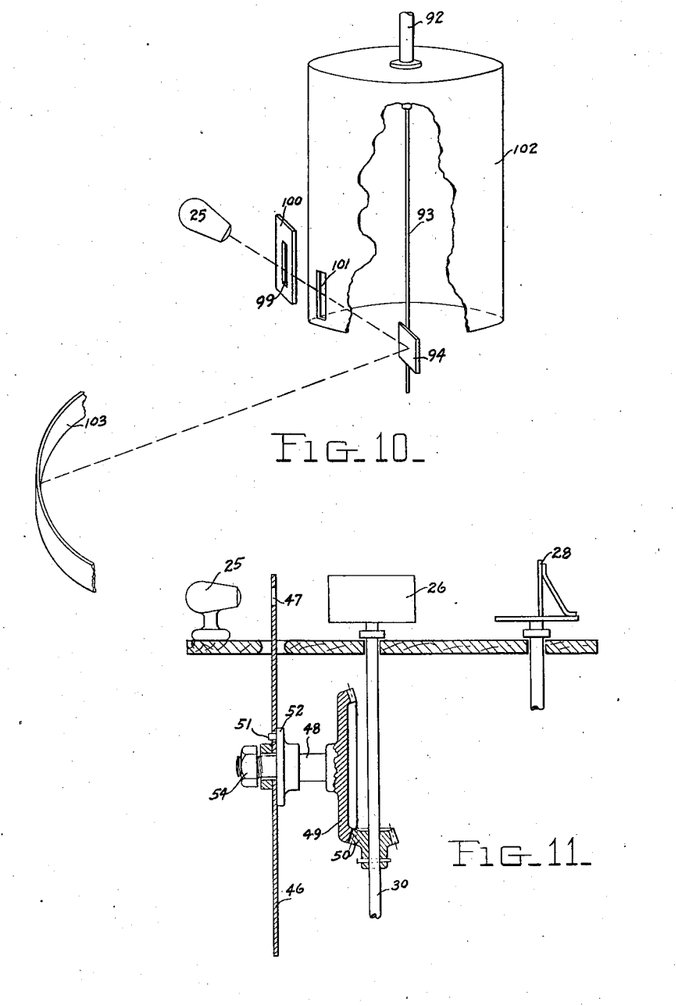
Fig. 11 illustrates one form of torque analyzing device.
Figure 12:
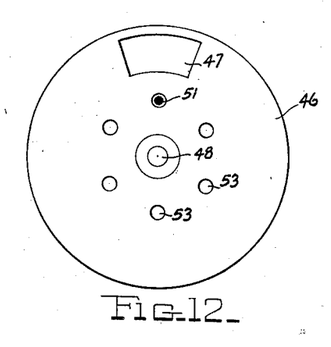
Figs. 12 and 14 show a disk shutter used in the torque analyzing device.

Fig. 11 illustrates an attachment for the torsion meter above described. It is a torque analyzer in the form of an analyzing shutter 46 that may be installed to select flashes resulting from any particular phase of the revolution of the main shaft. Therefore, the torque at each phase may be studied separately enabling an analysis to be made, which is especially valuable in cases of non-uniform torque or of torsional vibration. The analyzing shutter may be placed between the source of light 25 and the revolving mirror 28, on either side of the shutter. It has an opening 47 adjacent to its periphery to permit the passage of light beams once per revolution of the main shaft whose torque is being measured. The shutter is loosely mounted on shaft 48 which revolves at the same rate of speed as the main shaft, and is driven through reducing bevel gears 49 and 50 from the same shaft 30 that drives the shutter 26. The analyzing shutter is driven by a boss 51 that is carried by a collar 52 fixed to the shaft 48 and fits through any one of a number of equally spaced holes 53 (Fig. 12). It is circumferentially set by fitting the desired hole over the boss and tightening up on the holding nut 54.

Although the example given in connection with the torsion meter was for an apparatus giving six flashes per revolution of the main shaft, any convenient number (n) of flashes may have been used, but for the sake of clearness the following discussion will be confined to the basis of six flashes.

On this basis the opening in the analyzing shutter might have been theoretically one-sixth of 360°, or 60°. To allow for errors of construction and the like, reduce this opening to some convenient amount, say 40°. Since the slit 27 in the shutter 26 only occupies a small angle, something in the order of 1°, it is obvious that no great accuracy of workmanship is required to have the opening 47 match up with the slit in shutter 26. This is an advantage since it eliminates all effects of lost motion in the driving apparatus which actuates the analyzing shutter 46.

Figure 13:
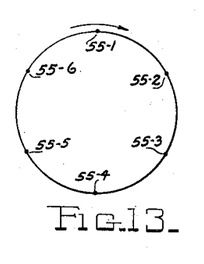
Fig. 13 represents diagrammatically the rotation of the main shaft as divided into a plurality of phases.
Figure 14:
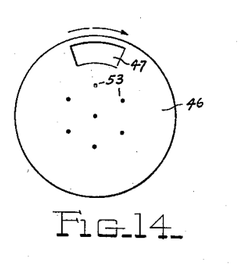

The principle involved in the operation of the torque analyzer may be understood from Figs. 13 and 14. In Fig. 13 each rotation of the shaft has been divided into six phases represented by the dots 55—1, 55—2, etc., on the circle. When the disk 46 is mounted with the aperture 53 that is radially inwardly of the opening 47 engaged with the boss 51, then the opening 47 will always be in position to permit the passage of a flash of light to the mirror 28 during the phase 55—1 of the rotation. If the aperture 53 next in advance in the clockwise direction from the opening 47 is engaged with boss 51, the flash will occur during phase 55—6, etc. It is to be understood that the rotation of the shaft may be divided into any number of phases corresponding to different parts of the cycle of a reciprocating engine, for example. The direction of rotation of the main shaft 32 is immaterial, as my invention may be operated in either direction. When it is not desired to use the analyzing disk, it may be removed from shaft 48, or merely held inoperative with the opening 47 set to permit passage of light from source 25 to shutter 26.

The torque analyzing device just described has the disadvantage that it can not be shifted from the operative to the inoperative condition while the system is in operation. I have therefore provided the alternative form disclosed in Fig. 15 to permit such changes to be made without stopping the apparatus. The analyzing disk 46 is mounted upon a hub 56 that has an inwardly extending lug 57. Hub 56 is mounted on a drum 58 that has a groove 59 adjacent one end thereof and opening into the groove a helical groove 159 that makes one revolution around drum 58. A slot 60 opens into groove 59 to permit the passage of lugs 57 when mounting the hub 56 on drum 58. A forked shift lever 61 is slidably mounted on a rod 62 and has a contact roller 63 at the end of each prong. A latch 64 is mounted on shift lever 61 to engage a slot in disk 46 whereby the disk 46 may be held stationary with its aperture 47 disposed to permit the passage of light from the lamp 25 to mirror 28. Lateral movement of lever 61 will cause the disk 46 to be moved in the same direction through contact of rollers 63 thereagainst, and the lug 57 will enter the helical groove 59; lug 57 will have driving engagement with the wall of groove 159 and disk 46 will be caused to rotate with drum 58. It is apparent that the position of disk 46 with respect to groove 159 will determine at what part of a rotation the opening 47 will permit passage of light through disk 46. To fix the position of disk 46 for analyzing any desired phase of a rotation, a bar 65 is placed adjacent rod 62 and is provided with clips adapted to receive handle 66 of lever 61, these clips being so positioned that when handle 66 is engaged by one of them, the disk 46 will be adapted to analyze a phase of the rotation. Shaft 67 would in this embodiment be connected in place of shaft 48 in Fig. 11.

Figure 15:
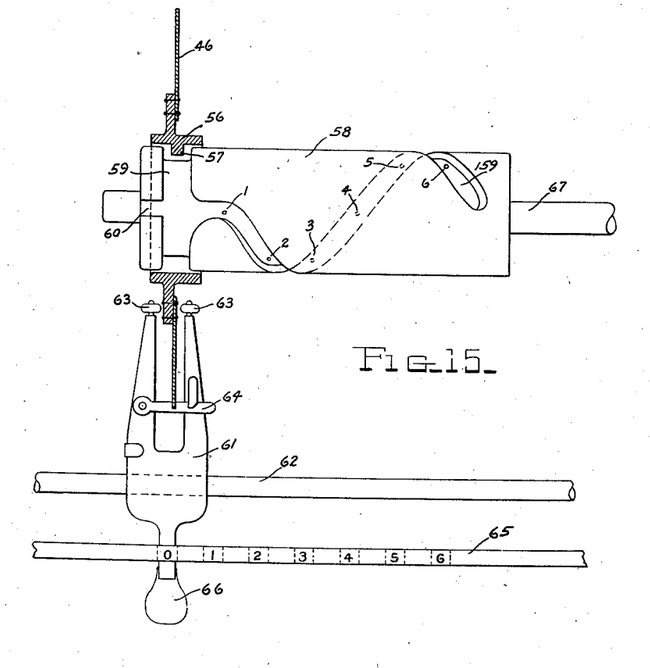
Fig. 15 is a view of another form of torque analyzer.
Figures 16, 17, 18, 19, 20, 21:
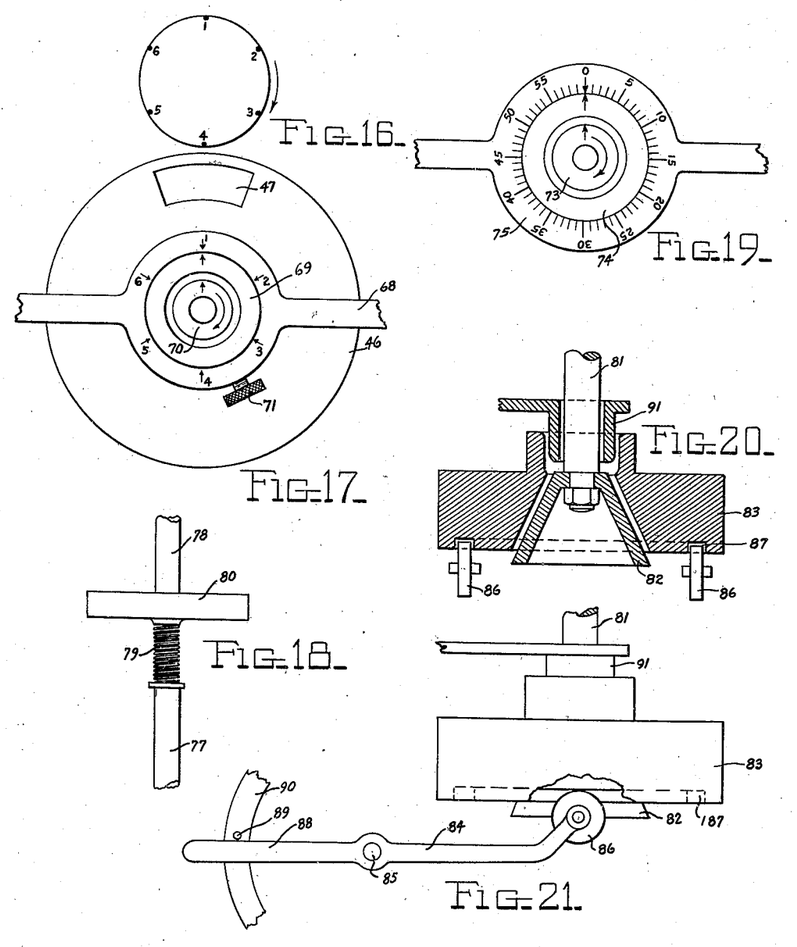
Figs. 16 and 17 are details of another torque analyzer.
Fig. 18 is a side elevation of a simple torque averager.
Fig. 19 shows diagrammatically the relation of the parts of a mechanism for exploring the rotation of the main shaft by stepless gradations.
Figs. 20 and 21 are details of the torque averaging device employed in my invention.

Instead of using the purely mechanical torque analyzers shown in Figs. 11 and 15, an electromechanical device such as that shown in Fig. 17 may be employed for this purpose. In this figure the bearing frame 68 may have mounted therein a stator 69 within which a rotor 70 is mounted. The rotor 70 is connected to the generator 42 and is self-synchronous therewith, while the stator 69 has in it a synchronized rotating field, the disk 46 being mounted on the rotor shaft. Assume the arrow on stator 69 to be set opposite the arrow 1 on stator frame 68; then the radial arrow on the rotor 70 will point to the arrow on the stator at each occurrence of the first phase in the rotation of shaft 32 and an analyzing flash will pass through opening 47 to rotating mirror 28, while the light that is passing through shutter 26 at any other phase in the rotation will be intercepted by disk 46. If the stator be rotated by hand and set with its arrow pointing to the arrow 2 on the stator frame, then the light will be passed to the mirror at the occurrence of the second phase, etc. Stator 69 is fixed in any setting by means of a set screw 71. When it is desired to keep the disk 46 inoperative, the arrows on the stator, the rotor and the arrow 1 on the stator frame are all aligned with each other and the switch opened to cut off the current from the rotor and stator.

In some instances it is desirable to ascertain the stress conditions in shaft 32 between the phases of the rotation. In the case of a well balanced turbine this would not be necessary but might be of considerable importance where shaft 32 is driven by a reciprocating engine or an internal combustion engine, both of which deliver a non-uniform torque. The generator used for this purpose is disclosed in Fig. 19.

Since identical mechanism is used in connection with both the mirror 28 and the shutter 26, but one of them will be described. The stator 74 is not permanently fixed but is free to be rotated and then locked at any desired position in the bearing frame 75. The rotor 73 is driven by shaft 32 to revolve at some multiple of the speed of the main shaft; in the case shown this multiple is 6. The radial arrow on the rotor corresponds to the position of one of its poles and opposite this pole there will be generated a "pole" in the revolving field of the stator. Stator 74 is so connected to the synchronized motor 76 on the shaft of shutter 26 that, as the generated pole of the revolving field passes the arrow on the stator, the light will pass to mirror 28. Bearing frame 75 is calibrated in 5 degree divisions. If the arrow on stator 74 be turned to the first division, the flash will pass to mirror 28 at 5 degrees from the first phase, if at the second mark, at 10 degrees past the first phase, and so on. In this way, the entire rotation may be explored by stepless gradations and the stress conditions be determined accurately at any desired point in the rotation of shaft 32. It is to be understood that the generator driving the shutter as just described must be set the same as the one on the other end of the shaft 32 which drives the co-acting mirror.

The electric leads feeding the stator and rotor are not shown in the schematic drawings. There should be enough slack in them to allow moving the stator 180° either way from its midpoint, thus making it possible to set the stator in any desired relative position in the bearing frame. This mechanism may be installed on either a generator or a motor, the latter being used in the installation shown in Fig. 1.

It may be desirable to obtain a measure of the average torque of the shaft 32, in which case it is necessary to utilize some means to store up energy during the periods of greatest torque and to return the stored up energy to the measuring apparatus when the torque is less. An elementary arrangement for this purpose is shown in Fig. 18 in which a shaft 77 drives a shaft 78 through spring 79, there being a fly-wheel 80 mounted on shaft 78. The fly-wheel 80 will tend to keep the shafts rotating at a uniform rate while the spring 79 permits minor variations in the rate of rotation of shaft 77. Figs. 20 and 21 give the details of one form of torque averaging means that may be employed in my invention. Shaft 81 may be either shaft 30 of shutter 26 or shaft 31 of mirror 28. A clutch cone 82 is secured to the lower end of shaft 81 in a conical recess centrally disposed in a fly-wheel 83. A forked arm 84 is pivoted at 85 and carries a roller 86 at the outer extremity of each arm, which rollers are adapted to engage the bottom of an annular groove 87 in the lower face of fly-wheel 83 to lift the fly-wheel out of driving engagement with cone 82 when desired. Handle 88 of the lever 84 may be disposed under a pin 89 on a locking sector 90 to retain fly-wheel 83 in the disengaging position.

It is obvious that the fly-wheel 83 must be disengaged when the apparatus is being used to observe the phases of rotation of the shaft since the purpose of the fly-wheel when engaged with cone 82 is to produce uniform rotation of shaft 81. The member 91 serves both as a bearing or guide for shaft 81 and as a stop to prevent undue upward movement of fly-wheel 83. It is important that the fly-wheel be so connected to shaft 81 that there will be no lost motion between the fly-wheel and cone 82 during either acceleration or deceleration and further that the fly-wheel shall be so balanced that it will not have a natural period of vibration that will put the system in resonance with the non-uniform torque of the main shaft. As shown in Fig. 1, there is a fly-wheel 83 mounted to be connected to the shaft of shutter 26 and one for the shaft of mirror 28. The lever 84 and rollers 86 make provision for engaging fly-wheel 83 with, or disengaging it from, cone 82 while the shaft 81 is rotating at high speed.

Figure 4:
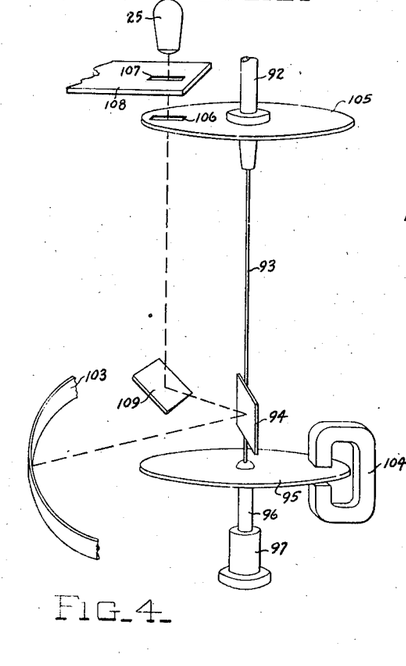
Fig. 4 shows a form of torsion tachometer that may be used in my invention.
Figure 9:
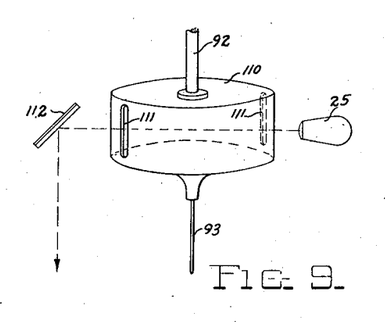
Figs. 9 and 10 illustrate other forms of torsion tachometers.

The usefulness of my invention is extended by the torsion tachometer now to be described. It has a number of advantageous features in that it does not depend upon gravity, centrifugal force, stroboscopic effects or clock mechanism. It can analyze the speed of shaft 32 at any phase of a single revolution or can be used when the torque is averaged by the mechanism above set forth. Several embodiments of my tachometer are shown in Figs. 4, 9 and 10. In all the forms shown in the enumerated figures, the shaft 92 is driven by a synchronized motor 76 and is provided with a torque averaging cone 82 and fly-wheel 83. Depending from shaft 92 is a torsion wire 93 to which is secured a mirror 94. A metal disk 95, which may be of aluminum, is carried by wire 93 and is retained in position by a pin 96 connected to disk 95 that is rotatable in a guide 97. Light from a source 25 passes through a slit 99 in a screen 100 that is disposed in front of slit 101 in a cylindrical shutter 102 (Fig. 10) mounted on shaft 92 to prevent light from slit 99 reaching mirror 94 except when slit 101 is aligned with slit 99. A scale 103 is disposed to receive the flashes of light from mirror 94. Disk 95 rotates between the poles on the magnet 104 and therefore, when the disk is in rotation, eddy currents are set up in the disk which exert a braking effect on wire 93 and twist the wire proportionately to the speed of rotation of disk 95.

With all parts of the mechanism at rest, the apparatus can be so set that the slits 99 and 101 are aligned, and the beam of light reflected from mirror 94 will strike the zero point on scale 103. If shaft 92 is then set in rotation, the braking effect between disk 95 and magnet 104 will twist wire 93 a definite amount that is proportional to the speed of rotation of shaft 92, and the reflected beam from mirror 94 will be displaced from the zero point on scale 103, which displacement will also be proportional to the speed of rotation of shaft 92. It is apparent that scale 103 may be so calibrated that it will indicate directly the number of revolutions per minute of shaft 92 which may be driven by motor 76 either at the same speed as shaft 32 or at some definite multiple thereof.

In Fig. 4, instead of the cylindrical shutter 102, I may use a disk 105 having in it a slit 106 that is adapted to be aligned with a slit 107 in a screen 108 interposed between disk 105 and light source 25. This form of shutter requires a mirror 109 to reflect the light from source 25 to mirror 94. Fig. 9 shows still another embodiment wherein a barrel shutter 110 provided with diametrically opposite slits 111 is rotated between light source 25 and mirror 112 which reflects to the mirror 109 the light that comes through the slits 111 when both are aligned with light source 25.

Disks 113 in Fig. 1 are driven by motors 76 to rotate at the same speed as shaft 32 and each is provided with a slit that is adapted to be brought into registry with one or more slits in the disks 105 that are driven at six times the speed of shaft 32. When the parts of motor 76 are set as described in connection with Fig. 19, the flashes of light from source 25 to mirrors 109 and 94 and thence to scale 33 can be made to occur at any point in a single revolution of shaft 32 and thereby the instantaneous speed of rotation of shaft 32 can be measured step by step.

Fig. 1 shows schematically a complete installation involving my invention. The assembly designated generally by A may be on the bridge of a ship, that designated by B may be in the log room, and that designated by C in the main control room. On the bridge are shown a simple torsion meter including the shutter 26 and mirror 28 driven respectively from two separated points on main shaft 32 at six times the speed of the shaft, and a tachometer to measure the time rate of the shaft revolutions. The form of tachometer here shown is somewhat different from those previously described in that mirror 114 is suspended on a wire 115 that is fixed at its upper end and carries a disk 116 at its lower end. Magnets 117 are mounted on a rotatable member 118 carried by shaft 119 that is driven by motor 120 at six times the speed of shaft 32. Light from source 25 passes through a slit in screen 121 to mirror 114. As magnets 117 rotate, they drag disk 116 around with them until the torsional resistance of wire 115 equals the tractive force of the magnets on disk 116, which results in a definite displacement of the beam of light from mirror 114 to scale 132 proportional to the rotational speed of magnets 117.

In the log room are the light source 25, the shutter 26 and mirror 28 arranged as before described, the light from the mirror 28 being projected upon a moving sensitized strip 34 driven by a motor 122. The film is enclosed in a light-tight compartment 123. A source of light 124 may be illuminated temporarily by means of switch 125 to project a beam of light on sensitized strip 34 to mark the beginning and termination of a desired time interval during which the light from mirror 28 has been recorded on 34. The disk 46 is disposed between source 25 and shutter 26 for use in analyzing the torque as previously described. Motors 76 that drive the shutter and the mirror are provided with the torque averaging fly-wheels 83. There is also a tachometer to make possible the measuring of the time rate of shaft revolutions in the log room. The motors 76 are constructed to permit of their use as phase divider apparatus described in connection with Fig. 19.

The equipment in the main control room is the same as that in the log room except that the torsion meter mechanism is of the instantaneous reading and not of the recording type.

It is obvious that by operating the shutter and the mirror of the torsion meter at six times the rate of rotation of the shaft, any twist in the shaft between the respective points of connection of the shutter and mirror thereto will be multiplied by six and therefore much more accurate reading is possible. Further, the system herein shown makes it possible to install the apparatus at places distant from the shaft where it is most convenient in respect to space and accessibility. Further, it is obvious that the two points of connection to the main shaft may be as far apart as desired without regard to intervening couplings or bulkheads, thus increasing the absolute amount of twist available for measurement and consequently enhancing the accuracy of measurement.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The form of tachometer shown in Fig. 4 is the subject of my United States Patent No. 1,968,859, issued August 7, 1934.

The invention herein described may be manufactured and used by or for the Government of the United States of America for governmental purposes without the payment of any royalty thereon.

I claim:

1. In means for observing the phenomena of a rotating shaft, a source of light, a rotatable mirror disposed to receive light from said source, a shutter comprising a rotatably mounted cylindrical member with diametrically opposed slots interposed between said source and said mirror, means to drive said mirror from a point on said shaft, other means to drive said shutter from a point on said shaft distant from the aforesaid point, indicating means disposed to receive light from said mirror, a clutch cone on the shaft of said shutter and one on the shaft of said mirror, a fly-wheel engageable with the cone on said shutter shaft and a fly-wheel engageable with the cone on said mirror shaft, means to move said fly-wheels into engagement with or out of engagement with their respective cones, said mirror and said shutter being driven at a speed different from that of the shaft being observed, a slotted disk mounted between said source and said mirror, and means to rotate said disk at the same speed as said shaft.

2. In means for observing the torsion phenomena of a rotating shaft at a plurality of stages in a single rotation, a source of light, a mirror rotatable at a speed different from that of said shaft, disposed to receive light from said source, a shutter disposed between said source and said mirror adapted to permit the passage of light to said mirror at intervals having a definite relation to the period of rotation of said shaft, means to drive said mirror from a point on said shaft, other means to drive said shutter from a point on said shaft distant from the aforesaid point, and indicating means disposed to receive light from said mirror.

3. In means for observing the torsion phenomena of a rotating shaft at a plurality of stages in a single rotation, a source of light, a rotatable mirror disposed to receive light from said source, a rotatable cylindrical member having diametrically opposed slots disposed between said mirror and said source, means to drive said mirror from a point on said shaft at a definite rate with respect to the rate of rotation of said shaft but not equal to the rate of rotation of said shaft, other means to drive said cylindrical member from said shaft at a point remote from the aforesaid point at the same rate as said mirror, and indicating means disposed to receive light from said mirror.

4. In means for observing the phenomena of a rotating shaft, a source of light, a rotatable mirror disposed to receive light from said source, a rotatable cylindrical member having diametrically opposed slots disposed between said mirror and said source, means to drive said mirror from a point on said shaft at a definite rate with respect to the rate of rotation of said shaft but not equal to the rate of rotation of said shaft, other means to drive said cylindrical member from said shaft at a point remote from the aforesaid point at the same rate as said mirror, indicating means disposed to receive light from said mirror, a rotatable slotted disk mounted between said source and said mirror, said disk being adjustable to different angular positions on its shaft, and means to rotate said disk at the same rate as said shaft.

5. In means for observing the phenomena of a rotating shaft, a source of light, a rotatable mirror disposed to receive light from said source, a rotatable shutter disposed between said source and said mirror adapted to permit the passage of light to said mirror at intervals having a definite relation to the period of rotation of said shaft, means to drive said mirror from a point on said shaft, other means to drive said shutter from a point on said shaft distant from the aforesaid point, indicating means disposed to receive light from said mirror, a fly-wheel connectible to and disconnectible from said shutter and a second fly-wheel connectible to and disconnectible from said mirror, and means so to connect and disconnect said fly-wheels while said mirror and said shutter are rotating.

6. In means for observing the phenomena of a rotating shaft, a source of light, a rotatable mirror disposed to receive light from said source, a rotatable shutter disposed between said source and said mirror adapted to permit the passage of light to said mirror at intervals having a definite relation to the period of rotation of said shaft, means to drive said mirror from a point on said shaft, other means to drive said shutter from a point on said shaft distant from the aforesaid point, indicating means disposed to receive light from said mirror, a fly-wheel connectible to and disconnectible from said shutter and a second fly-wheel connectible to and disconnectible from said mirror, means so to connect and disconnect said fly-wheels while said mirror and said shutter are rotating comprising a pivotally mounted bifurcated lever, a roller at the end of each fork of said lever, and means to lock said lever to hold said fly-wheels in the disconnected position.

7. In means for observing the phenomena of a rotating shaft, a source of light, a rotating mirror disposed to receive light from said source, a rotating shutter disposed between said source and said mirror, means for driving said shutter and said mirror from said shaft, a rotatable apertured disk disposed between said source and said mirror, a rotor operatively connected to said disk, a stator in which said rotor is mounted, said stator being adapted to have in it a revolving electric field and being angularly adjustable about the axis of said rotor, a bearing frame in which said stator is mounted, said stator, rotor and frame each bearing angular position indicia, and electric means driven by said shaft, said means being self-synchronizing with said stator and rotor and operatively connected thereto.

8. In means for observing the torsion phenomena of a rotating shaft at a plurality of stages in a single rotation, a source of light, a movable mirror disposed to receive light from said source, means to intercept the light from said source to said mirror except at predetermined intervals, devices to drive said mirror and said means from different points on said shaft, said mirror and said means being driven at the same speed which is different from that of said shaft, said devices including members adjustable to cause light to pass from said source to said mirror at any desired angular position in the rotation of said shaft, and indicating means disposed to receive the light from said mirror.

9. In a system of the class described, a source of light, a movable mirror disposed to receive light from said source, a shutter disposed between said source and said mirror, separate means to operate said shutter and said mirror, each of said means comprising a rotor, a stator within which said rotor is mounted, a bearing frame in which said stator is carried, said frame having adjacent said stator calibrations indicating angular positions, said stator being movable in said frame and bearing a reference mark adapted to be set at any of the said calibration marks on said frame, said rotor having a reference mark thereon corresponding in phase position to the mark on said stator, a synchronized device to drive said shutter operating means from a point on said shaft, a second like device to drive said mirror from said shaft at a point remote from the aforesaid point, and an indicating device disposed to receive light from said mirror, all the aforesaid parts being so connected that said shutter will permit light to pass to said mirror from said source at that angular position of said shaft indicated by the position of the reference mark on said stator with respect to the said calibrations on said frame.

10. In a system of the class described, means for measuring the torsional deformation of a shaft including devices driven from said shaft at spaced apart points on said shaft, and means including a movable inertia member associated with each of said devices to cause said devices to give a substantially constant average indication during all the phases of a complete rotation of said shaft.

11. In a system of the class described, means for indicating the torsional deformation of a rotating shaft including devices driven from said shaft at points spaced apart on said shaft, and movable means synchronized with said devices to prevent the giving of an indication except during a predetermined phase of the rotation of the shaft.

12. In a system of the class described, means acting to give normally a continuous indication visible from a fixed position for indicating the torsional deformation of a rotating shaft including devices driven from said shaft at points spaced apart on said shaft, and means to prevent the giving of an indication except at a predetermined instantaneous angular position of said shaft.

13. In a system of the class described, means acting to give normally a continuous indication visible from a fixed position for indicating the torsional deformation of a rotating shaft including devices driven at the same speed from said shaft at points spaced apart on said shaft and means to show the angular difference between the rotational phases of such devices, and mechanism to prevent the showing of such difference except at a predetermined phase of the rotation of such shaft.

14. In means for observing the phenomena of a rotating shaft, a source of light, a rotatable mirror disposed to receive light from said source, a shutter comprising a rotatably mounted cylindrical member with diametrically opposed slots interposed between said source and said mirror, means to drive said mirror from a point on said shaft, other means to drive said shutter from a point on said shaft distant from the aforesaid point of said shaft, indicating means disposed to receive light from said mirror, a fly-wheel, disengageable means to connect said fly-wheel to said mirror, a second fly-wheel, a second disengageable means to connect said second fly-wheel to said shutter, said mirror and said shutter being driven at a speed different from that of said shaft, a slotted disk mounted between said source and said mirror, and means to rotate said disk at the same speed as said shaft.

15. In means for observing the phenomena of a rotating shaft, a source of light, a rotatable mirror disposed to receive light from said source and a shutter adapted to permit the passage of light to said mirror at intervals having a definite relation to the period of rotation of said shaft, means to drive said mirror from a point on said shaft, other means to drive said shutter from a point on said shaft distant from the aforesaid point, indicating means disposed to receive light from said mirror, a high inertia member connectible to and disconnectible from said shutter and a second like member connectible to and disconnectible from said mirror, and means so to connect and disconnect said inertia members while said mirror and said shutter are rotating.

16. As an article of manufacture, a rotor, a stator on which said rotor is mounted, said stator being adapted to have in it a revolving electric field and being angularly adjustable about the axis of said rotor, a bearing frame in which said stator is mounted, said stator, rotor and frame bearing angular position indicia, and electric means driven by a rotating element, said means being self-synchronizing with said stator and rotor and operatively connected to said stator and said rotor.

17. In means for observing the phenomena of a rotating shaft, a rotor, a stator in which said rotor is mounted, said stator being adapted to have in it a revolving electric field and being angularly adjustable about the axis of said rotor, a bearing frame in which said stator is mounted, said stator, rotor, and frame each bearing angular position indicia, electric means driven by said shaft, said means being self-synchronizing with said stator and rotor and operatively connected thereto and indicating means operated in part by said rotor.

LYBRAND P. SMITH.